United States Patent
Stewart et al.

(10) Patent No.: US 9,148,058 B2
(45) Date of Patent: Sep. 29, 2015

(54) HIGH FREQUENCY SERIES AC VOLTAGE REGULATOR

(71) Applicant: Power Quality Engineering Limited, Hong Kong (HK)

(72) Inventors: Neal George Stewart, Hong Kong (HK); Wing Ling Cheng, Hong Kong (HK)

(73) Assignee: Power Quality Engineering Limited, Hong Kong (HK)

( * ) Notice: Subject to any disclaimer, the term of this patent is extended or adjusted under 35 U.S.C. 154(b) by 0 days.

(21) Appl. No.: 14/525,230

(22) Filed: Oct. 28, 2014

(65) Prior Publication Data
US 2015/0115913 A1  Apr. 30, 2015

Related U.S. Application Data

(60) Provisional application No. 61/896,635, filed on Oct. 28, 2013, provisional application No. 61/896,639,
(Continued)

(51) Int. Cl.
  *G05F 1/26* (2006.01)
  *H02M 3/158* (2006.01)
(52) U.S. Cl.
  CPC ..................................... *H02M 3/158* (2013.01)
(58) Field of Classification Search
  CPC ............... G05F 1/20; G05F 1/30; G05F 1/45; G05F 1/24; H02M 3/1582
  USPC .................. 323/239, 247, 259, 263, 343, 344
  See application file for complete search history.

(56) References Cited

U.S. PATENT DOCUMENTS

| | | | | |
|---|---|---|---|---|
| 3,499,169 A | * | 3/1970 | McVey et al. | 323/263 |
| 3,582,765 A | * | 6/1971 | McCabe | 323/263 |
| 3,596,172 A | * | 7/1971 | Harrison | 323/263 |
| 4,791,348 A | * | 12/1988 | McGuire et al. | 323/263 |
| 5,747,972 A | | 5/1998 | Baretich et al. | |
| 5,942,884 A | * | 8/1999 | Soar et al. | 323/282 |
| 6,020,726 A | * | 2/2000 | James | 323/239 |

(Continued)

FOREIGN PATENT DOCUMENTS

WO      2012137210 A2      10/2012

OTHER PUBLICATIONS

International Search Report and Written Opinion of PCT/CN2014/089721 issued by the State Intellectual Property Office of China on Feb. 4, 2015.

*Primary Examiner* — Adolf Berhane
(74) *Attorney, Agent, or Firm* — Ella Cheong Hong Kong; Sam T. Yip

(57) ABSTRACT

A bidirectional AC series voltage regulator that regulates an output AC voltage level regardless of the varying AC input voltage utilizing high frequency series inductors that only process a proportion of the total output power. The AC series voltage regulator detects the power inductor current direction data signal and can generate power inductor current direction data signals for its control to determine the AC input voltage polarity at all time; wherein the determination of the AC input voltage polarity is unambiguous during the AC input voltage zero crossover and near zero points; and wherein the determination of the AC input voltage polarity allows normal switching sequence of the AC bidirectional switches during the AC input voltage zero crossover and near zero points to prevent power "shoot-through."

12 Claims, 4 Drawing Sheets

Related U.S. Application Data filed on Oct. 28, 2013, provisional application No. 61/908,763, filed on Nov. 26, 2013, provisional application No. 61/913,932, filed on Dec. 10, 2013, provisional application No. 61/913,934, filed on Dec. 10, 2013, provisional application No. 61/913,935, filed on Dec. 10, 2013, provisional application No. 62/006,900, filed on Jun. 3, 2014, provisional application No. 62/006,901, filed on Jun. 3, 2014, provisional application No. 62/006,906, filed on Jun. 3, 2014.

(56) References Cited

U.S. PATENT DOCUMENTS

| | | | |
|---|---|---|---|
| 6,639,815 B1 * | 10/2003 | Gucyski | 363/40 |
| 6,847,515 B1 * | 1/2005 | Kelley et al. | 361/160 |
| 2001/0054887 A1 * | 12/2001 | Baretich et al. | 323/284 |
| 2003/0052658 A1 * | 3/2003 | Baretich et al. | 323/284 |
| 2007/0052397 A1 * | 3/2007 | Thompson et al. | 323/223 |
| 2012/0044728 A1 * | 2/2012 | Yatsu et al. | 363/126 |

* cited by examiner

| Polarity | | | | Unipolar switch commutation order | |
|---|---|---|---|---|---|
| Input voltage | | Inductor Current | | Forward -> Freewheel transition | Freewheel -> Forward transition |
| +ve | -ve | +ve | -ve | | |
| 0 | 0 | 0 | 0 | Switch unipolar device with a sequence in agreement with input voltage polarity and simultaneously maintain current continuity based on voltage and current polarity at the moment of commutation | Switch unipolar device with a sequence in agreement with input voltage polarity and simultaneously maintain current continuity based on voltage and current polarity at the moment of commutation |
| 0 | 0 | 1 | 0 | | |
| 0 | 0 | 0 | 1 | | |
| 0 | 0 | 1 | 1 | not allowed, current cannot be +ve and -ve at the same time | |
| 0 | 1 | 0 | 0 | Switch unipolar device with a sequence in agreement with input voltage polarity and simultaneously maintain current continuity based on voltage and current polarity at the moment of commutation | Switch unipolar device with a sequence in agreement with input voltage polarity and simultaneously maintain current continuity based on voltage and current polarity at the moment of commutation |
| 0 | 1 | 1 | 0 | | |
| 0 | 1 | 0 | 1 | | |
| 0 | 1 | 1 | 1 | not allowed, current cannot be +ve and -ve at the same time | |
| 1 | 0 | 0 | 0 | Switch unipolar device with a sequence in agreement with input voltage polarity and simultaneously maintain current continuity based on voltage and current polarity at the moment of commutation | Switch unipolar device with a sequence in agreement with input voltage polarity and simultaneously maintain current continuity based on voltage and current polarity at the moment of commutation |
| 1 | 0 | 1 | 0 | | |
| 1 | 0 | 0 | 1 | | |
| 1 | 0 | 1 | 1 | not allowed, current cannot be +ve and -ve at the same time | |
| 1 | 1 | 0 | 0 | not allowed, voltage cannot be +ve and -ve at the same time | |
| 1 | 1 | 1 | 0 | not allowed, voltage cannot be +ve and -ve at the same time | |
| 1 | 1 | 0 | 1 | not allowed, voltage cannot be +ve and -ve at the same time | |
| 1 | 1 | 1 | 1 | not allowed, voltage/current cannot be +ve and -ve at the same time | |

A logic '1' at entry indicate true identification of polarity
Both '0' at +ve and -ve entries indicate polarity is below +ve and -ve identification level

FIG. 3b

HIGH FREQUENCY SERIES AC VOLTAGE REGULATOR

CLAIM FOR DOMESTIC PRIORITY

This application claims priority under 35 U.S.C. §119 to the, U.S. Provisional Patent Application No. 61/896,635, filed Oct. 28, 2013, U.S. Provisional Patent Application No. 61/896,639, filed Oct. 28, 2013, U.S. Provisional Patent Application No. 61/908,763, filed Nov. 26, 2013, U.S. Provisional Patent Application No. 61/913,932, filed Dec. 10, 2013, U.S. Provisional Patent Application No. 61/913,934, filed Dec. 10, 2013, U.S. Provisional Patent Application No. 61/913,935, filed Dec. 10, 2013, U.S. Provisional Patent Application No. 62/006,900, filed Jun. 3, 2014, U.S. Provisional Patent Application No. 62/006,901, filed Jun. 3, 2014, and U.S. Provisional Patent Application No. 62/006,906, filed Jun. 3, 2014, the disclosures of which are incorporated herein by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to power electronics. Particularly, the present invention relates to methods and power electronics for regulating alternative current (AC) voltage, and more particularly regulating an output AC voltage to a desired level regardless of the variation in an input AC voltage.

BACKGROUND

AC voltage regulators are used to closely control and regulate the AC voltage level being delivered to a load connected to the output of the AC voltage regulator, regardless of the AC voltage variation at the input of the AC voltage regulator.

This has been traditionally done by various low frequency (LF), typically at 50 or 60 Hz, electrical mains magnetic structures. These structures are typically tapped at specific discrete transformer voltage taps in various transformers or transformer configurations. Nonetheless, all these structures rely on traditional AC switching devices such as relays or semiconductor devices such as silicon-controlled rectifiers (SCR)'s or gate turn off thyristor (GTO)'s connected as anti-parallel AC switches, TRIAC's, AC switches such as insulated-gate bipolar transistors (IGBT)'s, MOSFET transistors, and SCR's configured as AC switches, e.g. connected between rectifiers. These AC switches are selected and activated by the electronic control circuit to automatically switch the selected magnetic transformer structure tap, in turn adjusting the transformer or transformer configuration turns ratio to control the AC output voltage as close as possible to the desired level.

Another traditional method to regulate an output AC voltage is to use an electro-mechanically-adjusted auto-transformer that is driven by electrical mechanical means, such as a controlled electrical motor. The electronic control in this case senses the input voltage and then drives the electro-mechanical means to move the output contact to adjust the turns of the auto-transformer, in turn sets the correct turns ratio to fix the output AC voltage to the desired level. These electro-mechanically-adjusted auto-transformer devices are also LF magnetic structures, typically at 50 Hz or 60 Hz, and generally use carbon brushes to make the moving electrical contact to the auto-transformer windings. These brushes, however, undergo mechanical wear as such they need frequent maintenance and replacement.

A more sophisticated fully electronic version utilizes again LF mains transformers, typically at 50 Hz or 60 Hz, connected in series between the AC input and the AC output of the voltage regulator. As the input AC voltage level varies, the AC voltage regulator electronic control senses the input voltage level, and then sets up an in-phase positive or an in-phase negative differential AC voltage that adds or subtracts, to or from, the varying input AC voltage to maintain the output AC voltage to the desired set level. This traditional approach, in its various forms, still uses LF mains frequency transformers or LF magnetic structures, typically at 50 Hz or 60 Hz. In one configuration, the power electronics generates a LF mains frequency to correct the input AC voltage by a high frequency pulse width modulation (HF PWM) means, and this in-phase correction voltage to adjust the input AC mains voltage, is applied to the primary of the LF transformer, with the secondary of the LF transformer connected in series between the input and output of the AC power line. But still the magnetic structures used in these configurations, even though the power electronics operate at higher PWM frequencies, the final differential AC waveform is still applied to the LF series transformer, typically at 50 Hz or 60 Hz, hence the LF transformer or magnetic structures still have the disadvantage of size and weight.

A series AC voltage regulation method is disclosed in U.S. Pat. No. 5,747,972. This patent discloses a particular method of using only a simple voltage polarity control, which is a limited and simple method of control. It further describes the limit of the control switching states of power semiconductor devices that is created by only using the simple voltage polarity control method at the low AC input voltage positive and negative levels around the zero voltage crossover points. To solve this problem using only simple voltage polarity control method in this indeterminate low positive or negative input voltage level range around the zero voltage crossover points leads to an ambiguous determination of the actual input voltage polarity because of the low zero crossing AC input voltages, and hence the status of the PWM switching sequence of the power semiconductors at these low positive or negative voltage levels of the AC input voltage zero crossover points. The '972 patent discloses this input AC voltage polarity indeterminate low voltage level state at below 4 volts, positive and negative—13.65, 14.5 and again 17.65, 18.5, 18.10. Accordingly, an abnormal switching sequence is generated by turning on, for a short period (e.g. 13.65 microseconds as disclosed), all of the power semiconductor switching devices. This creates a power semiconductor "shoot-through" that short circuits the input AC power source, which can cause degrading or destructive damage of the semiconductor power devices. "Shoot-through" is a term very clearly understood in the electronics industry as a very serious condition that must be avoided for power semiconductors, and engineers are always critically concerned about "shoot-through" because of its degrading and destructive impact on the power semiconductors.

It is clearly taught in the '972 patent about the aforesaid problem but seemingly rely on the actual low AC input voltage at the points of positive and negative AC input voltage near zero crossover, and also the high voltage characteristics of power semiconductor conducting voltages. The '972 patent teaches to create a deliberate shoot-through PWM switching sequence status (13.65, 14.5, and 17.65, 18.5, 18.10). Thus, because of the limitation of using AC input voltage polarity control, the '972 patent attempts to solve this problem by actually generating a deliberate "shoot-through" state of the power semiconductor switching devices that actually short circuits the AC input voltage source. This is a critical compromise, and especially in the case with modern power semiconductor devices which have much lower on-resistance and depend on the low source resistance of the AC input power supply or circuit capacitance near the semiconductor power switches. Furthermore, a "shoot-through" can also create an undefined uncontrolled current steering in the power inductor that negatively impacts operating performance. Therefore, the series AC voltage regulation method as disclosed in U.S. Pat. No. 5,747,972 has serious shortcomings.

SUMMARY

It is an objective of the present invention is to provide an improved method of control that overcomes potential operating problems using only the simple voltage polarity control disclosed the U.S. Pat. No. 5,747,972 and other like prior arts. The present invention addresses the disadvantages of the previous traditional approaches in using series low mains frequency (typically at 50 Hz or 60 Hz), large and heavy magnetic structures. Since the size of any magnetics is largely inversely proportional to its operating frequency, the present invention approaches with this as a central design parameter. So another objective of the present invention is to achieve a unique efficient robust direct AC to AC bidirectional power flow high frequency (HF) AC series voltage regulator topology that utilizes HF (e.g. from 1 KHz to 1000 KHz) series magnetic structures that reduce significantly the size, weight and cost of these magnetic structures.

Since the HF AC series voltage regulator is normally connected to high AC voltage electrical distribution and grid networks and utilizes power semiconductors for switching these high voltages, extreme care has to be taken in specifying and even more significantly derating the voltage breakdown of these power semiconductors. So extreme care must be taken in the deployment of HF AC series voltage regulator especially in the pulse width modulation (PWM) control of these power semiconductors and the operating conditions of the power inductors that are connected to the power semiconductors. For example, referring to FIG. 1a, FIG. 1(b) and FIG. 2 (Power Inductor L3, Power Inductor L8, Power Inductors L3 and L4).

The power semiconductors must not experience destructive "shoot-through" and high voltages, especially under certain operating conditions that the PWM control method cannot define and lose control of the power semiconductor switch commutation states, or the condition as disclosed in the U.S. Pat. No. 5,747,972 in which potentially dangerous "shoot-through" is generated deliberately in the control switching sequence to solve the problem of using only AC input voltage polarity for the PWM switching sequence control.

Also there is a critical compromise of the HF AC series voltage regulator efficiency and robustness that cannot be solved by simply selecting safe high power semiconductor breakdown voltages or high conduction voltages as required in the U.S. Pat. No. 5,747,972.

In general for any semiconductor device, the higher the breakdown voltage the higher the conduction and switching losses, hence higher losses and power dissipation in the power semiconductor devices with lower efficiency and higher heat generated in the power semiconductor devices and in the overall HF AC series regulator product. With the present invention, no "shoot-through" PWM status is ever generated in the PWM switching sequence of the semiconductor power devices.

The present invention critically removes significant compromises and allows normal breakdown voltages and the use of low conduction voltages of the modern low on-resistance power semiconductor devices to be safely specified for the power semiconductor devices, hence the power semiconductor devices operate safely, with lower losses with less heat generated, and increases the HF series voltage regulator efficiency. Further driving the need of the present invention is the significant increase in sophistication in the PWM control method that operates differently to the aforementioned only simple voltage polarity method.

BRIEF DESCRIPTION OF THE DRAWINGS

Embodiments of the invention are described in more detail hereinafter with reference to the drawings, in which

FIG. 3b shows a table of logic switching for buck allowed states of the buck switch commutation sequence as shown in FIG. 3a.

DETAILED DESCRIPTION

In the following description, methods, systems, and apparatuses for regulating an output AC voltage to a desired level regardless of the variation in an input AC voltage and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
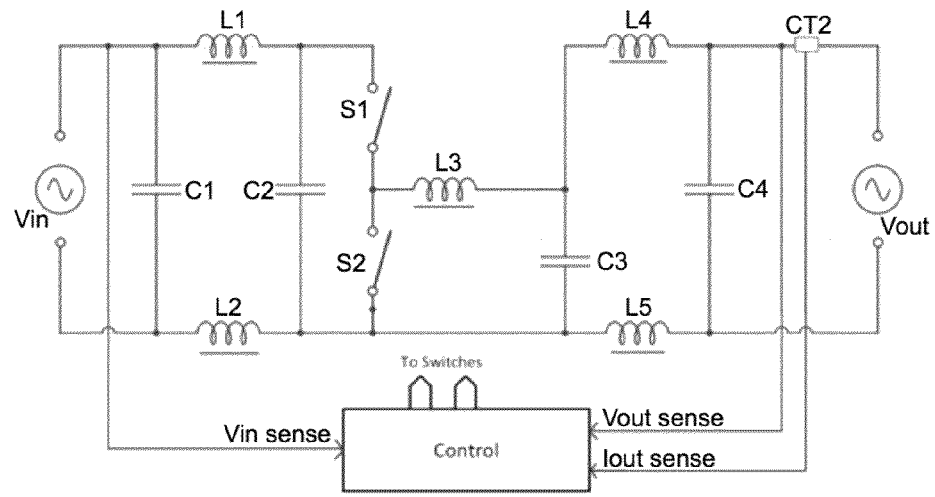
FIG. 1a depicts a circuit diagram of an embodiment of a HF AC series buck convertor with bidirectional AC semiconductor.

Referring to FIG. 1a. Shown in FIG. 1a is an AC series buck convertor with bidirectional AC semiconductor switches S1 and S2. Also shown in FIG. 1a are the HF filter components added to suppress and filter the HF (e.g. 1 Khz-1,000 Khz) switching frequency at the input and output. Filter inductors L1 and L2 with filter bypass capacitors C1 and C2 on the input; and filter inductors L4 and L5 with filter bypass capacitors C3 and C4 on the output. Filter inductors L4 and L5 with filter bypass capacitor C4 average the HF voltage PWM ripple to an average DC level to create a smooth regulated AC output voltage. Inductor L3 is a power inductor that is designed to operate at HF (e.g. 1 Khz to 1,000 Khz).

Since the bidirectional AC semiconductor switching devices S1 and S2 are switching at HF (e.g. 1 KHz to 1000 KHz) under electronic PWM control either through analogue or mix of digital and analogue circuitry, but typically digital control circuitry with DSP or microprocessor signal processing, and the PWM outputs from the control electronics drive the bidirectional AC Semiconductor switches S1 and S2 with HF (e.g. 1 KHz to 1000 KHz) PWM modulation, and at each HF point along the LF mains AC voltage input, typically at 50 Hz or 60 Hz, the PWM control electronics generates a specific PWM pulse of width wide enough to drive the bidirectional AC semiconductor switches S1 and S2 in combination with power inductor L3; hence bucking and regulating the output voltage at each point along the input AC voltage to the desired value set by the control set voltage reference.

For example, if the control is switching at a design frequency of 25,000 Hz, then for every 40 microseconds the amplitude of the input mains LF voltage, typically at 50 Hz or 60 Hz, is bucked and decreased at that point, against the set voltage reference. Thus, for every 40 µs the circuit bucks the input AC voltage to adjust and regulate the desired set output AC voltage. The input filter comprises capacitors C1 and C2, and filter inductors L1 and L2. The output filter comprises capacitors C3 and C4, and filter inductors L4 and L5. Alternatively, various combinations of HF filter elements can be used to filter and bypass the HF switching frequencies of the bidirectional AC semiconductor switches switching at HF, such as in this example at 25,000 Hz, and average the HF voltage PWM ripple to an average DC level to create a smooth regulated AC output voltage.

Figure 1B:
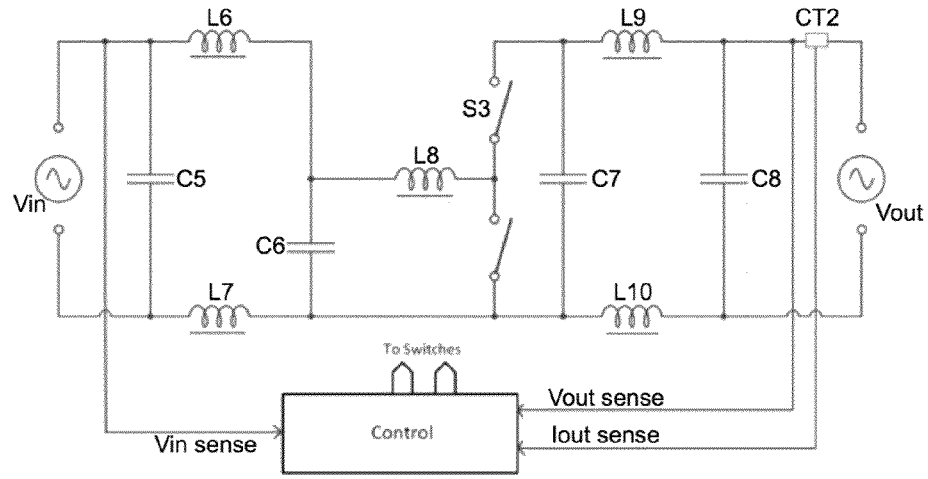
FIG. 1b depicts a circuit diagram of another embodiment of a HF AC series boost convertor with bidirectional AC semiconductor.

Referring to FIG. 1b. Shown in FIG. 1b is an AC series boost convertor with bidirectional AC semiconductor switches S3 and S4. Also shown in FIG. 1b are the HF filter components added to suppress and filter the HF (e.g. 1 Khz-1,000 Khz) switching frequency at the input and output. Filter inductors L6 and L7 with filter bypass capacitors C5 and C6 on the input. Filter inductors L9 and L10 with filter bypass capacitors C7 and C8 on the output. Filter inductors L9 and L10 with filter bypass capacitor C8 average the HF voltage PWM ripple to an average DC level to create a smooth regulated AC output voltage. Inductor L8 is a power inductor designed to operate at HF (e.g. 1 Khz to 1,000 Khz).

Since the bidirectional AC semiconductor switches S3 and S4 are switching at HF (e.g. 1 KHz to 1000 KHz) under electronic PWM control either through analogue or mix of digital and analogue circuitry, but typically digital control circuitry with DSP or microprocessor signal processing, and the PWM outputs from the control electronics drive the bidirectional AC semiconductor switches S3 and S4 with HF (e.g. 1 KHz to 1000 KHz) PWM modulation, and at each HF point along the LF mains AC voltage Input, typically 50 Hz or 60 Hz, the control electronics generates a specific PWM pulse of width wide enough to drive the bidirectional AC semiconductor switches S3 and S4 in combination with power inductor L8; hence boosting and regulating the output voltage at each point along the input AC voltage to the desired value set by the control voltage reference.

For example, if the control is switching at a design frequency of 25,000 Hz, then for every 40 microseconds the amplitude of the Input mains LF Voltage, typically at 50 Hz or 60 Hz is boosted and increased at that point, against the set voltage reference. Thus, for every 40 microseconds the PWM control circuit driving the bidirectional AC semiconductor switches S3 and S4 in combination with the power inductor L8, boosts the input AC voltage to adjust and regulate the desired set Output AC voltage. The input filter comprises capacitors C5 and C6, and filter inductors L6 and L7. The output filter comprises capacitors C7 and C8, and filter inductors L9 and L10. Alternatively, various combinations of HF filter elements can be used to filter and bypass the HF switching frequencies of the AC bidirectional semiconductor switches, switching at HF, such as in this example at 25,000 Hz, and average the HF voltage PWM ripple to an average DC level to create a smooth regulated AC output voltage.

Figure 2:
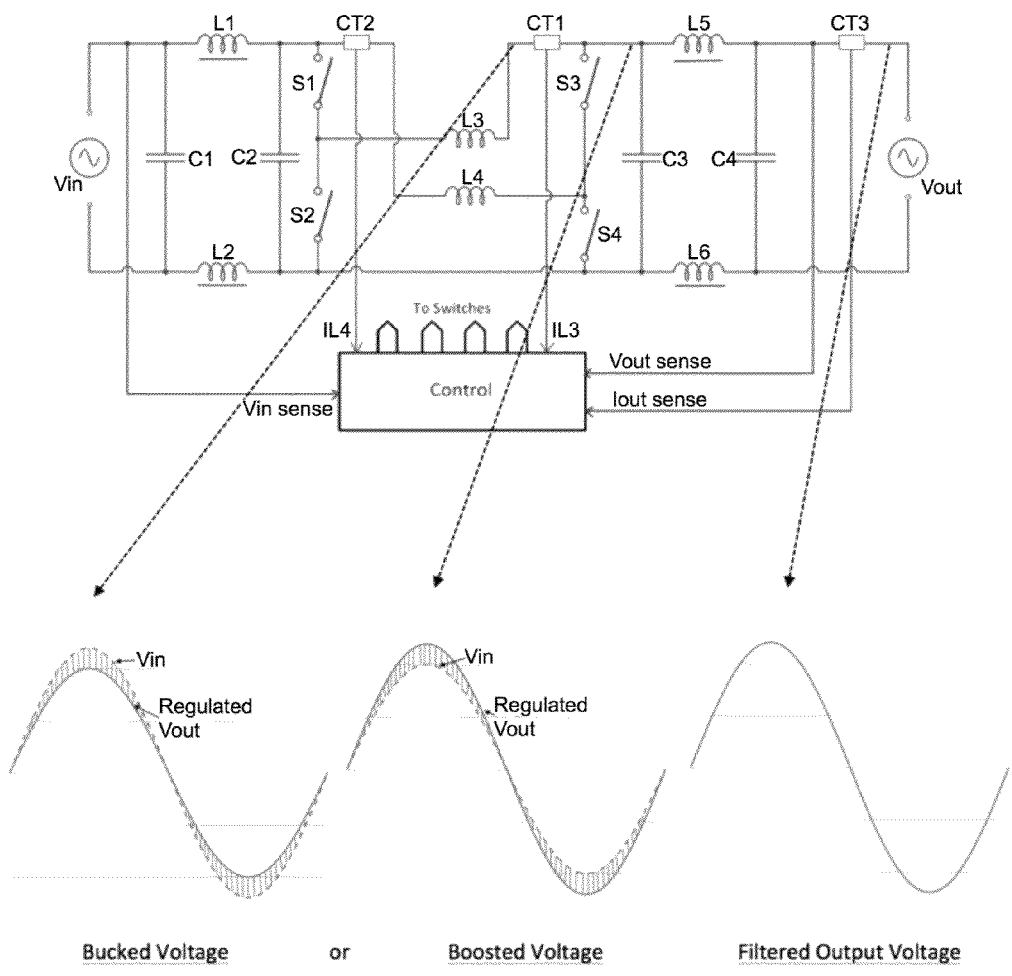
FIG. 2 depicts a circuit diagram of an embodiment of a HF AC series buck-boost voltage regulator.

A person who is ordinarily skilled in the art may choose to use the individual buck AC series voltage regulator section as shown in FIG. 1a as a AC series buck voltage regulator, or the individual boost AC series voltage regulator as shown in FIG. 1b as a AC series boost voltage regulator, a combination of the buck AC voltage regulator as shown in FIG. 1a with the boost AC voltage regulator as shown in FIG. 1b as a complete full HF AC series voltage regulator, or the automatic voltage regulator (AVR) is shown in FIG. 2 as a full HF AC-AC series AVR automatic voltage control topology.

FIG. 2 shows the basic operating principles of the present invention as a complete full AVR HF AC series voltage regulator that can buck or boost the AC input voltage at each HF point. For example, if the operating frequency of the AVR HF AC voltage regulator is configured to be 25 kHz, then the input voltage is sensed by the electronic analogue or mix of digital and analogue circuitry and compared to a voltage reference, and then the AC bidirectional semiconductor switches S1, S2, S3, and S4 in combination with the power inductors L3 and L4 are driven under PWM control to buck (reduce) or boost (increase) the AC input voltage at the AVR HF AC series voltage regulator output. The voltage is adjusted at each 40 microsecond interval point through each LF mains voltage cycle, typically, but not limited to, 50 Hz or 60 Hz. Therefore, under an analogue or digital electronic PWM control with reference to a fixed reference voltage level, the full AVR HF AC series voltage regulator is able to fully regulate the AC output voltage to the desired set level.

FIG. 2 also shows the waveforms of the HF PWM bucking or boosting the input AC voltage at the AVR HF AC series voltage regulator output, and the input filter components C1, C2, L1, and L2 in combination are used to eliminate the HF switching energy from passing back into the input AC source; and the output filter components C3, C4, L5, and L6 in combination are used to eliminate the output HF PWM switching pulses and to average the HF voltage PWM ripple to an average DC level, creating a smooth regulated AC output voltage.

The circuitries and description thereof disclosed herein are simplified for clarity and various other circuit configurations and devices can be used in applying the principles of the present invention. For instance, the bidirectional AC switches are semiconductor devices and can comprise of various circuit configurations, but these switches are still acting as AC bidirectional semiconductor switches as used commonly in the industry. Such Bidirectional AC semiconductor switches, for example, but not limited to, can be a rectifier bridge comprising of four rectifiers with a unipolar semiconductor device configuration inserted in the bridge such as SCR, GTO, IGBT, MOSFET, or any other semiconductor device used for the same effect with PWM drive control that can create a controlled bidirectional AC semiconductor switch device. Also, other semiconductor AC switch configurations and devices used in the industry with or without rectifiers such as back-to-back or anti-parallel-SCR's, GTO, IGBT, RB-IGBT, MOSFET, any other back-to-back or anti-parallel bidirectional AC semiconductor devices or configurations, or any other similar new semiconductor devices in the future, such as, but not limited to, GaN, SiC are some of the alternative embodiments of the present invention.

Although only single phase electrical systems are described herein, the principles of the present invention can be applied to other AC frequency and poly-phase AC systems, for example, common 3-phase electrical systems, by utilizing and interconnecting a number of the HF AC series buck topology, HF series boost topology, or combined AVR HF series buck-boost topology for full HF AC AVR automatic voltage control sections or units to create poly-phase voltage regulators. Since these HF series voltage sections can be independently controlled, they can also be designed for voltage balancing configurations to rebalance out of balance poly-phase voltages.

The AVR HF buck-boost AC series voltage regulator shown in FIG. 2 utilizes the HF (e.g. 1 KHz-1,000 KHz) power inductor L3 in combination with the AC bidirectional semiconductor switches S1 and S2 to bucks the AC input voltage, and HF power inductor L4 in combination with the AC bidirectional semiconductor switches S3 and S4 to boosts the AC input voltage. The AC bidirectional semiconductor switches, S1, S2, S3, and S4, are driven individually by PWM outputs from the electronic control circuit to create an AVR automatic voltage control topology that can decrease (buck) or increase (boost) the input AC voltage to regulate the AC output voltage to a set desired level. This design is power-flow bidirectional, direct single stage, and has no internal DC link capacitor, which is typically an unreliable electrolytic capacitor.

In other embodiments, the buck topology and the boost topology can operate separately. Along with the combined AVR HF buck-boost AC series voltage regulator topology shown in FIG. 2, anyone of these topologies needs only to process a portion of the total output power depending on the level of AC input voltage range and variation.

At each HF PWM interval, for example 40 microsecond PWM intervals at 25 kHz, the input voltage in bucked (reduced) or boosted (increased) under HF switch PWM control that generates the correct PWM drive signal to the bidirectional AC semiconductor switches at each HF point on the mains low frequency, typically 50 or 60 Hz, to buck or boost and correct the output AC voltage level to a desired set output AC voltage reference fed to the control electronics.

Other embodiments include various filter configurations that can create the desired effect as described above, with an input filter configuration to eliminate the high frequency switching pulses from entering the input AC mains source, and an output filter configuration eliminating the high frequency switching pulses from the output AC voltage. Still other embodiments include an AC output voltage feedback loop and control electronics to regulate the output voltage to meet the AC output voltage specification of a root-mean-square (RMS), the preferred embodiment, an average voltage, or peak voltage levels of the AC output voltage.

Also, the AVR HF AC series buck-boost AC voltage regulator, and the independent buck or boost sections if used separately, only have to process the differential power across the buck and boost inductors, L3 and L4 respectively, to regulate the varying input AC voltage to a fixed and regulated output AC voltage; thus, this is much less power than the total output power because of the configuration. The buck and boost inductors, L3 and L4 respectively only have to handle the proportion of the total output power required to adjust the differential input AC voltages to regulate the output AC voltage to the desired set level.

The control of an independent HF AC series Buck topology, an independent HF AC series boost topology, or a combined AVR HF series buck-boost topology for full HF AC AVR automatic voltage control can be configured to be a simple voltage Polarity PWM control as disclosed in the aforementioned U.S. Pat. No. 5,747,972. However, as previously discussed, such simple voltage polarity PWM control method cannot ensure the safe commutation of the power semiconductor devices due to the deliberate power semiconductor "shoot-through" during the voltage polarity sensing ambiguity at the very low voltages near the positive and negative zero crossing of the input AC voltage.

The present invention teaches away from U.S. Pat. No. 5,747,972 and other known prior arts in that for example, the HF AC series buck convertor section comprises bidirectional AC semiconductor switches S1 and S2, in combination with power inductors L3 and current transformer CT1. The current transformer CT3 in FIG. 2 is typical and commonly used in most power supplies, as it is used here, to simply measure the output current as output current over-current protection, or over-current protection can be accomplished by current transformers added in series with each of the power semiconductor devices to accomplish the same function as the output currents are detected by the current overprotection transformers and the output current information is fed back to the control circuit to shut down or limit the output current to control output current for output over-current protection. Output over-current protection is also referred to in U.S. Pat. No. 5,747,972. However, as detailed in FIGS. 1, 4, 5, 6, 7, and 9, except for FIG. 4 in the '972 patent disclosure, no current transformer is shown in any of these figures. And the current transformers T1 and T2 that appear only in FIG. 4 in the '972 patent disclosure are used as typical output over-current protection current sensing transformers. This is also confirmed in Par. 14.50 of in the '972 patent's specification and clearly indicated and explained as typical and common "Output Over Current protection", and the current sensing information from T1 and T2, the only Current Transformers referred to in FIG. 4 in the '972 patent disclosure, are not used or anywhere disclosed as relevant to the PWM switching AC voltage control method. So clearly U.S. Pat. No. 5,747,972 teaches only the use of only simple voltage polarity PWM control without using any current information in the power inductors, which is the unique and critical basis of the present invention. So clearly in the case of U.S. Pat. No. 5,747,972, and also in all of the disclosed prior arts included thereof, it discloses many topology figures that do not even include a current transformer included. The only figure that it did include, the current transformers T1 and T2 were only used for standard common typical over-current protection. Therefore, it is clear that U.S. Pat. No. 5,747,972 discloses that only simple voltage polarity PWM control was used to generate the PWM power semiconductor switching sequence for the actual buck AC voltage regulation. The critical current direction sensing in the actual power inductors as used in the present invention is a PWM control method improvement over the prior arts that was clearly never considered in U.S. Pat. No. 5,747,972. The advantages of this new improved invention will be further made clear in the following disclosure, and has significant critical advantages and improvements with respect to the PWM control method in safe commutation of the power semiconductors to generate a PWM control power semiconductor switching sequence method that never generates a "shoot-through" status, hence specifically prevents degradation or destructive "shoot-through" as disclosed in the present invention.

For the purpose of demonstrating the critical advantages of the present invention over the just simple voltage polarity control in U.S. Pat. No. 5,747,972, referring to FIG. 2 for example, in the HF AC series buck convertor section, the current transformer CT3 is used for typical output over-current protection, whereas the current transformer CT1 is the critical specific improvement in the present invention as current transformer CT1 generates the critical L3 power inductor current direction data for the AC power semiconductor switches S1 and S2. The PWM control method in the present invention specifically uses the current direction in the power inductor L3 for the HF AC series buck convertor section. The use of current transformers CT1 and CT2 as shown in FIG. 2 is one method of sensing current direction in a conductor, other means can be utilized, such as utilizing Rogowski coil or coils, resistor or resistors in series with the power inductor, Hall Effect devices associated with the magnetic field from the power inductor, or other known various methods of deriving the actual current information from the voltage waveform across the power inductor winding or partial inductor winding or additional windings on the power inductor specifically for this industry known inductor voltage method, or combination of these current sensing devices, but the use of any alternative current sensing devices, does not in any way address or avoid the core innovative new PWM control method principle of the present invention in using the power inductor current direction as the critical parameter to derive, in this for example, the buck convertor PWM switching sequence method, regardless of the method of how the power inductor current direction is actually sensed.

For the purpose of further demonstrating that the present invention is a clear and significant improvement and departure from the prior arts, referring to the HF AC series boost convertor section as shown in FIG. 2 and to just the boost convertor section of the full buck-boost AVR for example. The boost convertor section comprises major boost convertor components, namely the AC semiconductor switches S3 and S4, power inductor L4, and power inductor L4 current transformer CT2. The current transformer CT3 is used for common and typical output over-current protection, whereas the current transformer CT2 is the critical specific improvement in the present invention as it generates the critical L4 power inductor current direction data for the power semiconductor PWM control that specifically uses the current direction in the power inductor L4 for the boost section. And as detailed above for the buck convertor section as an example, the use of any alternative current sensing devices or methods, does not in any way address or avoid the core innovative new PWM control method principle of the present invention in using the power inductor current direction as the critical parameter to derive, in this for example, the boost convertor PWM switching sequence method, regardless of the method of how the power inductor current direction is actually sensed.

To summarize the critical advantages of the improvement of the present invention over the simple only voltage polarity PWM control method as disclosed in U.S. Pat. No. 5,747,972, a new innovative PWM Control method in accordance to the present invention not only uses voltage polarity but uniquely and specifically uses in addition the critical data for the current direction in the power inductors. This allows the PWM switching sequence of the power semiconductors to be driven by the PWM control to be based on an absolute controlled switching sequence without ambiguity that allows the PWM control to steer the power inductor current into the appropriate power semiconductor device without resorting to any degrading or destructive "shoot-through" condition, such that the deliberate "shoot-through" of the power semiconductors as taught in U.S. Pat. No. 5,747,972 is completely and safely avoided.

Figure 3A:
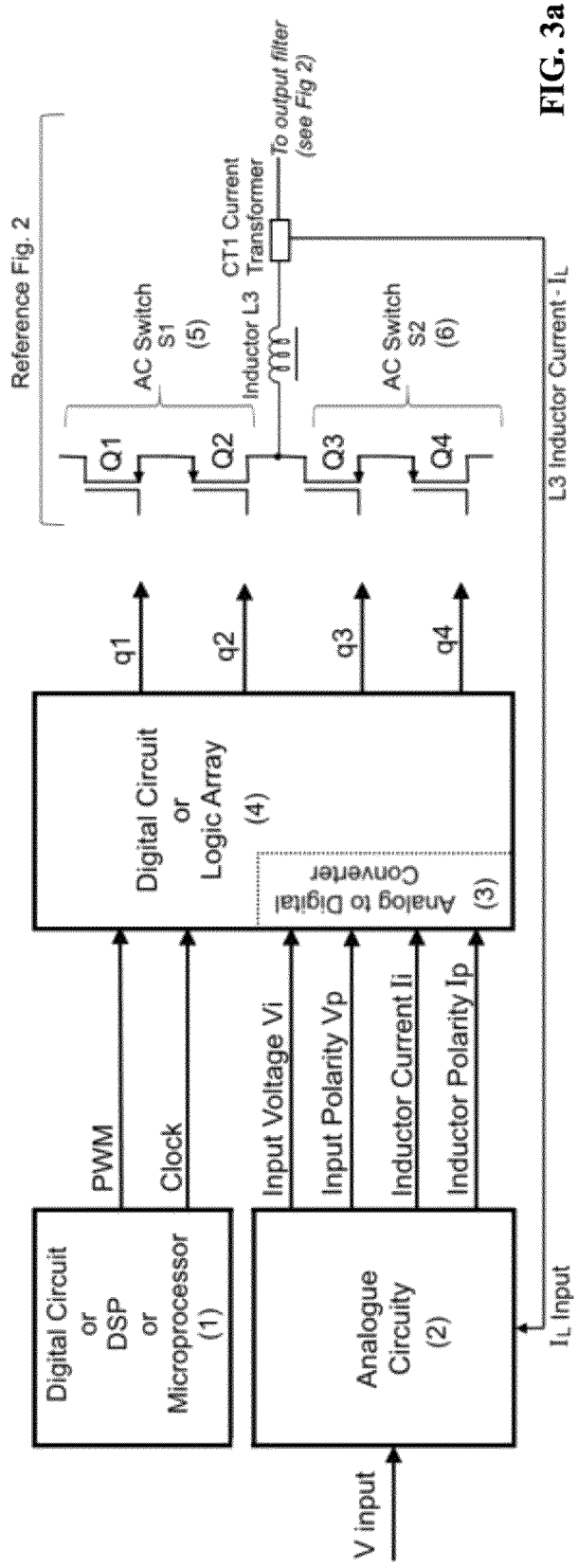
FIG. 3a depicts a schematic diagram of an embodiment of a buck switch control circuit.

FIG. 3a shows the following functioning electronic circuit sections:
  (1) Digital circuitry that can also be, but not limited to, a DSP or a microprocessor that generates digital outputs such as PWM and clock signals, as inputs to the power semiconductor switching sequence digital circuit (4).
  (2) Analogue circuitry that comprises, but not be limited to, discrete circuitry, or generally single or multiple combination of analogue integrated circuits that accepts the Input AC voltage (V input) and the major and critical parameter of the present invention—L3 inductor current, which is shown here as the analogue current signal from the current transformer CT1 in this example, that indicates the current level and direction in power inductor L3 (L3 inductor current). This analogue circuitry then processes these analogue inputs to generate analogue outputs as analogue inputs to the analogue to digital convertors (3). The analogue circuitry functional section (2) generates the following analogue and digital outputs:
    Vi—Input AC voltage.
    Vp—Input AC voltage polarity as positive (+VE), negative (−VE), or zero (0).
    Ii—Inductor current in power inductor L3 from current transformer CT1.
    Ip—Inductor current polarity in power inductor L3 from Ii as +VE, −VE, or 0.
  (3) Analogue-to-digital convertors, and these analogue-to-digital convertors are generally integrated into and as part of the power semiconductor switching sequence digital circuit (4), or can be separated. The digital convertors (3) accept the analogue outputs from the analogue circuit function section (2) and convert the analogue inputs Vi, Ii, into digital format Vp, Ip that is then used and processed by the digital circuit (4) with the digital PWM and clock inputs from the digital circuit (1) to generate the necessary power semiconductor PWM switching sequence q1, q2, q3, and q4.
  (4) AC power semiconductor switches (5) and (6) as back-to-back unipolar MOSFET power semiconductor devices. The buck section AC power semiconductor top switch S1 comprises the combined back-to-back unipolar MOSFET power semiconductor devices Q1 and Q2. The AC power semiconductor bottom switch S2 comprises the combined back-to-back unipolar MOSFET power semiconductor devices Q3 and Q4. These power semiconductor devices: Q1, Q2, Q3, and Q4 are switched and control independently driven by the PWM switching sequence outputs q1, q2, q3, and q4 generated from the PWM switching sequence digital circuitry (4).

An ordinarily skilled person in the art can generate a number of different configurations of analogue and digital circuitry to reproduce the same functions as detailed above; but these potentially different analogue or digital configurations in no way can avoid the basis of this new and innovative principle of the present invention in that the specific use of the current information in the power inductor to remove the problem of only using voltage polarity PWM control method when the AC input voltage approaches low positive and negative levels at the AC Input voltage zero crossover points.

Since the present invention removes the compromise in using the voltage polarity alone as taught in U.S. Pat. No. 5,747,972 without the current direction in the power inductor that allows all of the PWM switching sequence for the power semiconductors to be determined unambiguously and safely as disclosed in the present invention, so the present invention allows this new HF AC series buck topology, a HF series boost topology, or a combined AVR HF series buck-boost topology for full HF AC AVR automatic voltage control to be scaled up and down in power levels and voltage levels with the relevant and appropriate selection of components such as the semiconductor power devices with respect to current, voltage and thermal design considerations, the sizing and performance of the power inductor, and the other components as determined by anyone skilled in the art of scaling this new innovative topology as disclosed in the present invention.

In summary, referring to the full buck section in FIG. 2 in combination with the input and output filters and components, the PWM switching sequence for the independently controlled power semiconductor devices (5): Q1 and Q2 for S1 in FIGS. 2, and (6): Q3 and Q4 for S2 in FIG. 2, with the utilization of the current information in power inductor L3 through the current transformer CT1 generating the current level and direction in power inductor L3, combined with the control functional Sections for the AC voltage regulator buck section, as in this example (1), (2), (3), and (4) creates an innovative invention that, in this example, an AC HF voltage regulator that overcomes the limit, compromise, and risk of using only voltage polarity information for the PWM switching Sequence, as with the critical improvement of the present invention, of using the critical power inductor current direction as detailed above. Thus, this new innovative PWM control method never generates an undefined PWM switching sequence for the power semiconductors, and certainly not a deliberate "shoot-through" PWM sequence. So Referring to FIG. 3a and FIG. 3b. The steps for the PWM control method, for example, of the buck section of the present invention is as follows:

1) Establish an input voltage polarity signal (Vp) from the input voltage information (Vi). The input voltage polarity signal (Vp) includes three logic states: positive (+VE), negative (−VE), and zero (0); where zero (0) refers to an input voltage lower than a predefined absolute value, e.g. 1 Volt or below. In referencing, for example FIG. 3a, the input voltage polarity signal (Vp) is derived from the input voltage (Vi) with the analogue circuitry, section (2).

2) Establish an inductor current polarity signal (Ip) from the power inductor L3 current signal (Ii) from the power inductor L3 current transformer CT1, to derive the power inductor L3 current direction polarity information (Ip). The power inductor current polarity signal (Ip) includes three logic states: positive (+VE), negative (−VE), and zero (0); where zero (0) refers to an inductor current lower than a predefined absolute value, e.g. 2% of full load inductor current or below. In referencing, for example FIG. 3a, the inductor current polarity signal (Ip) in the power inductor L3 is derived from the power inductor current (Ii) signal from the power inductor L3 current transformer CT1, and the inductor current polarity signal (Ip) is generated with the analogue circuitry (2).

3) The switching states of the four independent power semiconductor devices under PWM control and driven by switching signals q1, q2, q3, and q4 derived from the digital circuitry (4), which can be, for example, but not limited to, a logic array, as shown in this example section (4) referencing FIG. 3a. In this preferred embodiment, the bidirectional AC semiconductor switches in the buck section of the AVR HF AC series buck-boost AC voltage regulator referencing S1 and S2 in FIG. 2 are shown as using back-to-back unipolar MOSFET power semiconductor devices Q1, Q2, Q3, and Q4, as for example the form and configuration, but not limited to, as shown here for example in FIG. 3a, (5) and (6) are now sequenced correctly and unambiguously based upon the voltage and current polarity information referencing Step 1) and Step 2) above. For example, and referring to FIG. 3a and the preferred embodiment is the use of four back-to-back independently controlled unipolar semiconductor power switches Q1, Q2, Q3, and Q4, such as unipolar MOSFETS as in this example, again referring to FIG. 3a, that are configured to operate as bidirectional AC semiconductor switches, again shown as S1 and S2 in FIG. 2, reference the buck section only of the AVR HF AC series buck-boost AC voltage regulator referencing FIG. 2. The four independently controlled unipolar power semiconductor devices Q1, Q2, Q3, and Q4 as shown in this example referencing FIG. 3a have very specific PWM switching sequences derived from Step 1) above, and very critical, and the basic principle of the present invention—the power inductor L3, in this example, current polarity—Step 2). Therefore, each PWM switching sequence is absolutely and unambiguously specifically controlled and generated for each of the forward to freewheel transition as well as freewheel to forward transition, that guarantees all switching states are clearly defined for all operating conditions, including heavy reactive leading or lagging loads, and never a dangerous and deliberate "shoot-through" condition in that switching sequence, as taught U.S. Pat. No. 5,747,972.

A similar PWM control and switching sequence can be constructed for both the buck topology, as in this example, and the boost topology, for the two transitions for any complementary AC power semiconductor switches.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An alternate current (AC) series voltage regulator for regulating an AC output voltage of an AC output power source, comprising:
   an AC high frequency (HF) series voltage buck power regulator topology for bucking an AC input voltage of an AC input power source, comprising:
   a first and a second independently controllable AC bidirectional switches,
   a first power inductor, and
   a first current transformer for generating a first power inductor current direction data signal indicating the first power inductor current direction;
   an AC HF series voltage boost power regulator topology for boosting the AC input voltage, comprising:
   a third and a forth independently controllable AC bidirectional switches,
   a second power inductor, and
   a second current transformer for generating a second power inductor current direction data signal indicating the second power inductor current direction; and
   a control circuitry for receiving the AC input voltage, an AC reference voltage, the AC output voltage, the first power inductor current direction data signal, and the second power inductor current direction data signal, and generating switch driving signals for the AC bidirectional switches.

2. The AC series voltage regulator of claim 1, wherein the AC HF series voltage buck power regulator topology being activated and operating, and wherein the AC HF series voltage boosting power regulator topology being inactivated.

3. The AC series voltage regulator of claim 1, wherein the AC HF series voltage boost power regulator topology being activated and operating, and wherein the AC HF series voltage bucking power regulator topology being inactivated.

4. The AC series voltage regulator of claim 1, further comprising an input filter for eliminating HF switching energy from passing back into the AC input power source.

5. The AC series voltage regulator of claim 4, wherein the input filter comprising two capacitors and two inductors.

6. The AC series voltage regulator of claim 1, further comprising an output filter for averaging HF voltage ripple to create a smooth regulated voltage level for the AC output voltage.

7. The AC series voltage regulator of claim 6, wherein the output filter comprising two capacitors and two inductors.

8. The AC series voltage regulator of claim 1, further comprising a third current transformer for generating an output current measurement signal to the control circuitry to achieve over-current protection.

9. The AC series voltage regulator of claim 1, wherein the switch driving signals for the AC bidirectional switches being pulse width modulation (PWM) control signals.

10. The AC series voltage regulator of claim 1, wherein each of AC bidirectional switches comprising one or more power semiconductor devices.

11. The AC series voltage regulator of claim 10, wherein the power semiconductor devices being back-to-back unipolar MOSFET power semiconductor devices, silicon-controlled rectifiers (SCR)'s, gate turn off thyristor (GTO)'s connected as anti-parallel AC switches, TRIAC's, insulated-gate bipolar transistors (IGBT)'s, MOSFET transistors, or SCR's configured as AC switches.

12. The AC series voltage regulator of claim 1,
wherein the control circuitry uses the AC input voltage polarity, and either one or both of the first power inductor current direction data signal and the second power inductor current direction data signal for a determination of a switching sequence of the AC bidirectional switches;
wherein the switching sequence of the AC bidirectional switches determined is unambiguous; and
wherein the determination of the unambiguous switching sequence of the AC bidirectional switches eliminates any necessity of any power "shoot-through" in the switching sequence.

* * * * *